(12) United States Patent
Ulupinar et al.

(10) Patent No.: US 8,284,706 B2
(45) Date of Patent: Oct. 9, 2012

(54) SEMI-CONNECTED OPERATIONS FOR WIRELESS COMMUNICATIONS

(75) Inventors: Fatih Ulupinar, San Diego, CA (US); Avneesh Agrawal, San Diego, CA (US); Parag A. Agashe, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1151 days.

(21) Appl. No.: 11/858,755

(22) Filed: Sep. 20, 2007

(65) Prior Publication Data

US 2009/0082072 A1    Mar. 26, 2009

(51) Int. Cl.
*G08C 17/00* (2006.01)

(52) U.S. Cl. ......... 370/311; 370/310; 370/328; 370/329

(58) Field of Classification Search .................. 370/310, 370/311
See application file for complete search history.

(56) References Cited

U.S. PATENT DOCUMENTS

| | | | |
|---|---|---|---|
| 5,239,557 A | 8/1993 | Dent | |
| 5,778,026 A | 7/1998 | Zak | |
| 6,377,803 B1 | 4/2002 | Ruohonen | |
| 6,400,960 B1 | 6/2002 | Dominique et al. | |
| 6,654,613 B1 | 11/2003 | Maeng et al. | |
| 6,721,712 B1 | 4/2004 | Benyassine et al. | |
| 6,950,632 B1 | 9/2005 | Yun et al. | |
| 6,967,970 B2 | 11/2005 | Terry et al. | |
| 7,072,306 B2 | 7/2006 | Blessent | |
| 7,075,907 B1 | 7/2006 | Lintulampi | |
| 7,224,993 B2 | 5/2007 | Meyers et al. | |
| 7,277,737 B1 | 10/2007 | Vollmer et al. | |
| 7,295,827 B2* | 11/2007 | Liu et al. | 455/343.2 |
| 7,437,172 B2 | 10/2008 | Chen et al. | |
| 7,483,386 B2 | 1/2009 | Leonard | |
| 7,564,819 B2 | 7/2009 | Khan | |
| 7,852,805 B2 | 12/2010 | Kahtava et al. | |

(Continued)

FOREIGN PATENT DOCUMENTS

CN    1572077    1/2005

(Continued)

OTHER PUBLICATIONS

IEEE 802.20 Working Group on Mobile Broadband Wireless Access, 820.20 Session #23, Mar. 2007.*

(Continued)

*Primary Examiner* — Robert Scheibel
*Assistant Examiner* — Gautam Sharma
(74) *Attorney, Agent, or Firm* — Darrell Scott Juneau; Charles E. Eggers

(57) ABSTRACT

Systems and methodologies are described that facilitate reducing battery consumption during periods of inactivity intermixed with traffic bursts in wireless communications systems. A semi-connected mode is provided that fast recognition of mobile devices upon wakeup and access while enabling mobile devices to operate in reduce power states. A mobile device operates in a semi-connected mode with all base stations in an active set of the mobile device. Moreover, mechanisms are provided to notify mobile devices of pending data while avoiding latency associated with paging channels.

64 Claims, 11 Drawing Sheets

U.S. PATENT DOCUMENTS

| | | |
|---|---|---|
| 8,094,595 B2 | 1/2012 | Montojo et al. |
| 8,098,635 B2 | 1/2012 | Montojo et al. |
| 2003/0108013 A1 | 6/2003 | Hwang et al. |
| 2003/0137953 A1* | 7/2003 | Chae et al. .................. 370/331 |
| 2004/0202147 A1 | 10/2004 | Hakkinen et al. |
| 2004/0229605 A1 | 11/2004 | Hwang et al. |
| 2006/0126554 A1 | 6/2006 | Motegi et al. |
| 2006/0171312 A1 | 8/2006 | Obuchi et al. |
| 2006/0285526 A1 | 12/2006 | Jang et al. |
| 2007/0070942 A1* | 3/2007 | Harris et al. .................. 370/329 |
| 2007/0070944 A1 | 3/2007 | Rinne et al. |
| 2008/0056188 A1* | 3/2008 | Lu et al. .................. 370/330 |
| 2008/0080432 A1* | 4/2008 | Lu et al. .................. 370/335 |
| 2008/0102880 A1 | 5/2008 | Gholmieh et al. |
| 2008/0259855 A1* | 10/2008 | Yoon et al. .................. 370/329 |
| 2009/0046650 A1 | 2/2009 | Dalsgaard et al. |
| 2011/0002281 A1 | 1/2011 | Terry et al. |

FOREIGN PATENT DOCUMENTS

| | | |
|---|---|---|
| EP | 0971489 A2 | 1/2000 |
| EP | 1342339 A2 | 9/2003 |
| EP | 1424796 A1 | 6/2004 |
| EP | 1734698 | 12/2006 |
| GB | 2406751 | 4/2005 |
| JP | 9261153 | 10/1997 |
| JP | 11046162 | 2/1999 |
| JP | 2002530940 A | 9/2002 |
| JP | 2005507191 | 3/2005 |
| JP | 2006217151 A | 8/2006 |
| KR | 20060131049 A | 12/2006 |
| RU | 2262193 C2 | 10/2005 |
| WO | WO9949689 A2 | 9/1999 |
| WO | WO0030328 A1 | 5/2000 |
| WO | WO0110056 A1 | 2/2001 |
| WO | WO0152566 | 7/2001 |
| WO | WO2004047474 A1 | 6/2004 |
| WO | WO2005055630 A1 | 6/2005 |

OTHER PUBLICATIONS

LBC, Qualcomm and Motorola, Oct. 26, 2006, 3GPP2, hereinafter known as 3GPP2.*

Anonymous: "IEEE Standard for Local and Metropolitan Area Networks Part 20: Air Interface for Mobile Broadband Wireless Access Systems Supporting Vehicular Mobility Physical and Media Access Control Layer Specification; IEEE Std. 802.20-2008" IEEE Standard, pp. 1, 673-692 (Aug. 29, 2008) XP017601912. ISBN: 978-0-7381-5766-5.

Jette, A. et al.: "IEEE 802.20 Working Group on Mobile Broadband Wireless Access," IEEE C802.20-07/09, pp. 1-34 (Mar. 5, 2007) XP002519747.

International Search Report, PCT/US2008/077077—International Search Authority—European Patent Office. Mar. 30, 2009.

Written Opinion, PCT/US2008/077077—International Search Authority—European Patent Office, Mar. 30, 2009.

3GPP TR 25.840 v4.0.0; "3rd Generation Partnership Project; Technical Specification Group Radio Access Network; Terminal power saving features," 3GPP TR 25.840 version 4.0.0 Release 4, XP003001813 (Dec. 2003), pp. 1-30.

3rd Generation Partnership Project, "Technical Specification Group Radio Access Network; Multiplexing and channel coding", 3GPP TS 25.212 version 6.5.0 Release 6, (Jun. 2005), Section 4.6.

Ely, et al., "Electromagnetic Interference Assessment of CDMA and GSM Wireless Phones to Aircraft Navigation Radios" 21th. DASC. The 21th. Digital Avionics Systems Conference Proceedings. Irvine, CA, Oct. 27-31, 2002; [Digital Avionics Systems Conference], New York, NY: IEEE, US, vol. 2, Oct. 27, 2002, pp. 1055-1067, XP010616283.

Ericsson: "DRX in Connected mode," 3GPP TSGR2#7(99)A93, 3GPP, Malmo, Sweden, Sep. 20, 1999.

Taiwan Search Report—TW097136423—TIPO—Jan. 11, 2012.

"Universal Mobile Telecommunications System (UMTS)," ETSI Standards, European Telecommunications Standards Institute, 3GPP TS 25.331 Version 6.5.0 Release 6, vol. 3-R2, No. V650, Mar. 2005.

* cited by examiner

SEMI-CONNECTED OPERATIONS FOR WIRELESS COMMUNICATIONS

BACKGROUND

I. Field

The following description relates generally to wireless communications and, more particularly, to a semi-connected mode of operation in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method that effectuates expeditious access while reducing battery consumption in a wireless communications system is described herein. The method can comprise initiating a semi-connected mode with one or more base stations in an active set. In addition, the method can include operating in the semi-connected mode to enable expedited system access with bursty traffic.

Another aspect relates to a wireless communications apparatus that can comprise a memory that retains instructions related to initiating a semi-connected mode with one or more base stations in an active set and operating in the semi-connected mode to enable expedited system access with bursty traffic. The wireless communications apparatus can also include a processor coupled to the memory, configured to execute the instructions retained in the memory.

Yet another aspect relates to a wireless communications apparatus that effectuates reduce power consumption during periods of inactivity. The apparatus can include means for initiating a semi-connected mode with one or more base stations in an active set. In addition, the apparatus can comprise means for operating in the semi-connected mode to enable expedited system access with bursty traffic.

Still another aspect relates to a machine-readable medium having stored thereon machine-executable instructions for initiating a semi-connected mode with one or more base stations in an active set. The machine-readable medium can further include instructions for operating in the semi-connected mode to enable expedited system access with bursty traffic.

According to another aspect, in a wireless communication system, an apparatus can comprise a processor configured to initiate a semi-connected mode with one or more base stations in an active set. The processor can also be configured to operate in the semi-connected mode to enable expedited system access with bursty traffic.

According to yet another aspect, a method that facilitates expeditious access while reducing battery consumption in a wireless communications system is described herein. The method can comprise receiving a request to initiate at a semi-connected mode. In addition, the method can include transmitting an information block on a shared signaling channel to notify a mobile device of pending data. Further, the method can comprise accepting access through MAC ID scrambled access.

Another aspect described herein relates to a wireless communications apparatus that can include a memory that retains instructions related to receiving a request to enter into at a semi-connected mode, notifying a mobile device of pending data through an information block on a shared signaling channel and providing access through MAC ID scrambled access. In addition, the wireless communications apparatus can comprise a processor coupled to the memory, configured to execute the instructions retained in the memory.

Yet another aspect relates to a wireless communications apparatus that effectuates reduce power consumption during periods of inactivity. The apparatus can comprise means for receiving a request to initiate a semi-connected mode. In addition, the apparatus can include means for transmitting an information block on a shared signaling channel to notify a mobile device of pending data. Further, the apparatus can comprise means for accepting communications through MAC ID scrambled access.

Still another aspect relates to a machine-readable medium having stored thereon machine-executable instructions for receiving a request to enter into a semi-connected mode. The machine-readable medium can further include instructions for notifying a mobile device of pending data through an information block on a shared signaling channel. In addition, the machine-readable medium can comprise instructions for providing system access through MAC ID scrambled access.

A further aspect described herein relates to a processor configured to receive a request to initiate at a semi-connected mode. In addition, the processor can be configured to transmit an information block on a shared signaling channel to notify a mobile device of pending data. Further, the processor can be configured to accept system communication through MAC ID scrambled access.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
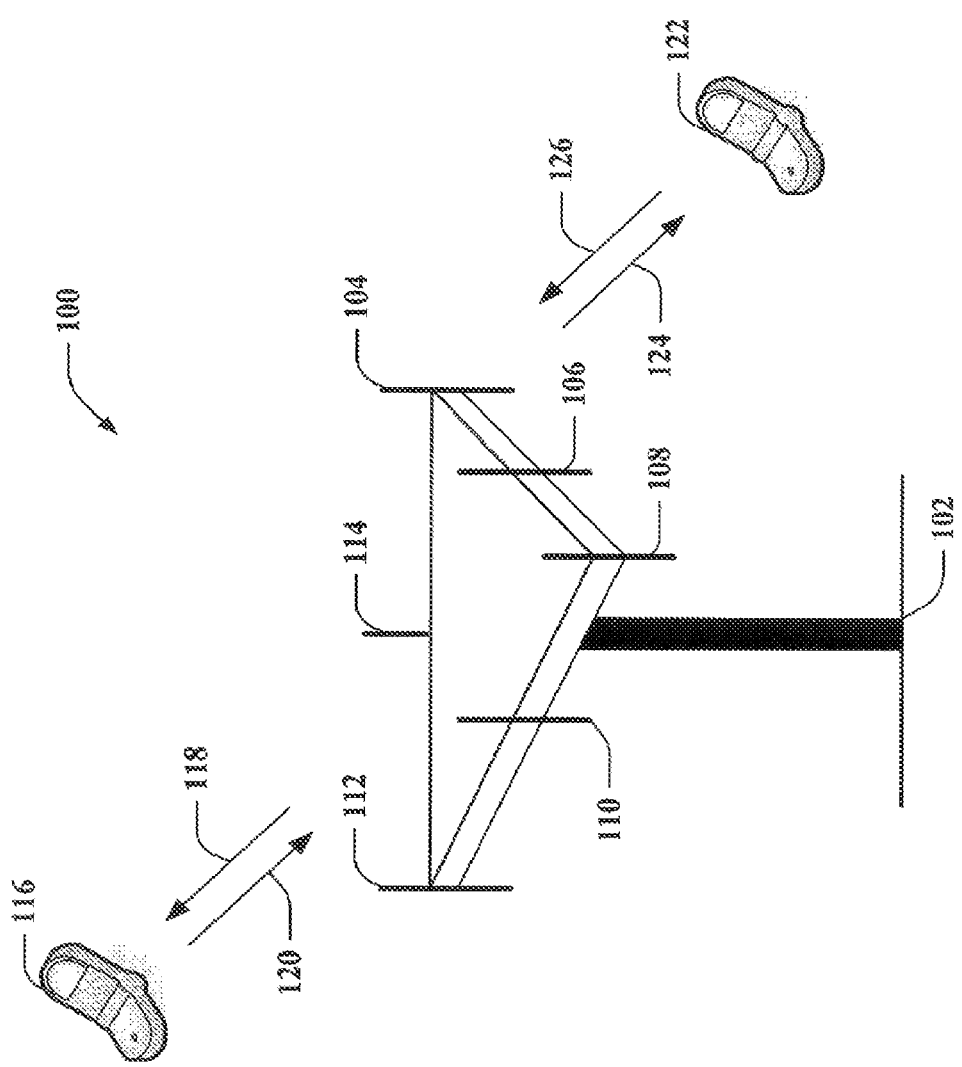
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

Figure 2:
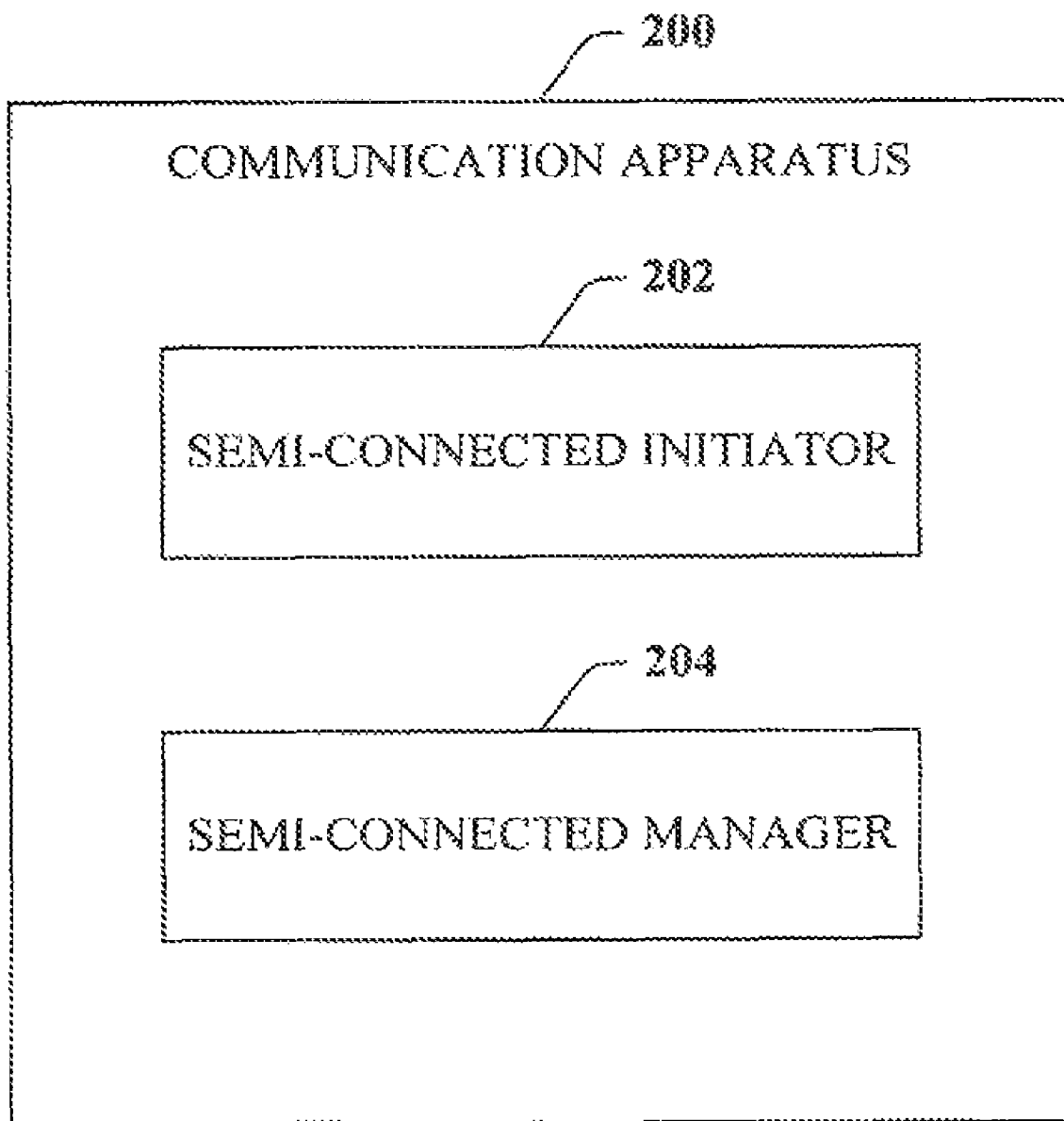
FIG. 2 is an illustration of an example communications apparatus for employment within a wireless communications environment.

Turning to FIG. 2, illustrated is a communications apparatus 200 for employment within a wireless communications environment. Communications apparatus 200 may be a base station or a portion thereof or a mobile device or a portion thereof. Communications apparatus 200 may include a semi-connected initiator 202 that facilitates establishing a semi-connected operational mode or state between a mobile device and one or more base stations. Communications apparatus 200 may further include a semi-connected manager that facilitates maintaining and operating within the semi-connected mode. According to an illustration, communication apparatus 200 can be employed in a wireless communication system where applications typically generate bursts of traffic after a period of inactivity. For example, such applications may include web browsing, chat, certain games, audio and/or video streaming, etc. The particular burst amount or inactivity period depends on the characteristics of the application. A web browsing application may have a different burst amount and inactivity period than video streaming. The applications may be supported by a mobile device initiated connection or a base station originated connection. A mobile device initiated connection gains minimizes delay with fast access but, due to anonymity of the initial access, can not be guaranteed quality of service (QoS) by a base station even when a mobile station is camped in the system. A base station originated connection enables short sleep cycles but incurs paging delays and access delays. Communications apparatus 200 enables efficiently support such applications in terms of system capacity and battery consumption.

In the semi-connected mode, a mobile device may sleep during a specified period. The sleep period provides battery power savings compared to a connected state. A base station recognizes the mobile device during an access period as an ongoing connection. Thus, base station may provide QoS treatment right after access. The base station may bypass paging channels to wake the mobile terminal, reducing latency and cost associated with paging. The semi-connected mode may return to a fully connected state with a small delay. During the transition, power and timing references may be sent after the interval while reverse control channels were deactivated. Semi-connected initiator 202 may establish the semi-connected operation between a mobile device and one or more base stations via message passing. The messages may be passed between semi-connected initiator 202 and a similarly situated initiator component in either a mobile device or base station. Subsequently, semi-connected manger 204 facilitates operations in the semi-connected state. For example, semi-connected manager 204 may provide MAC ID scrambled access for a mobile device to enable a base station to immediately recognize the mobile device upon access. In addition, semi-connected manager 204 may maintain the semi-connected state to prevent mode termination due to supervision failure or the like.

Moreover, although not shown, it is to be appreciated that communications apparatus 200 may include memory that retains instructions with respect to determining covariance (e.g., transmit covariance, correlation, . . . ) from observation of a channel, altering matrices in a predefined codebook based upon the covariance, generating feedback by employing the altered matrices, analyzing received feedback by utilizing the altered matrices, controlling transmission over a channel based upon the feedback, and the like. Further, communications apparatus 200 may include a processor that may be utilized in connection with executing instructions (e.g., instructions retained within memory, instructions obtained from a disparate source, . . . ).

Figure 3:
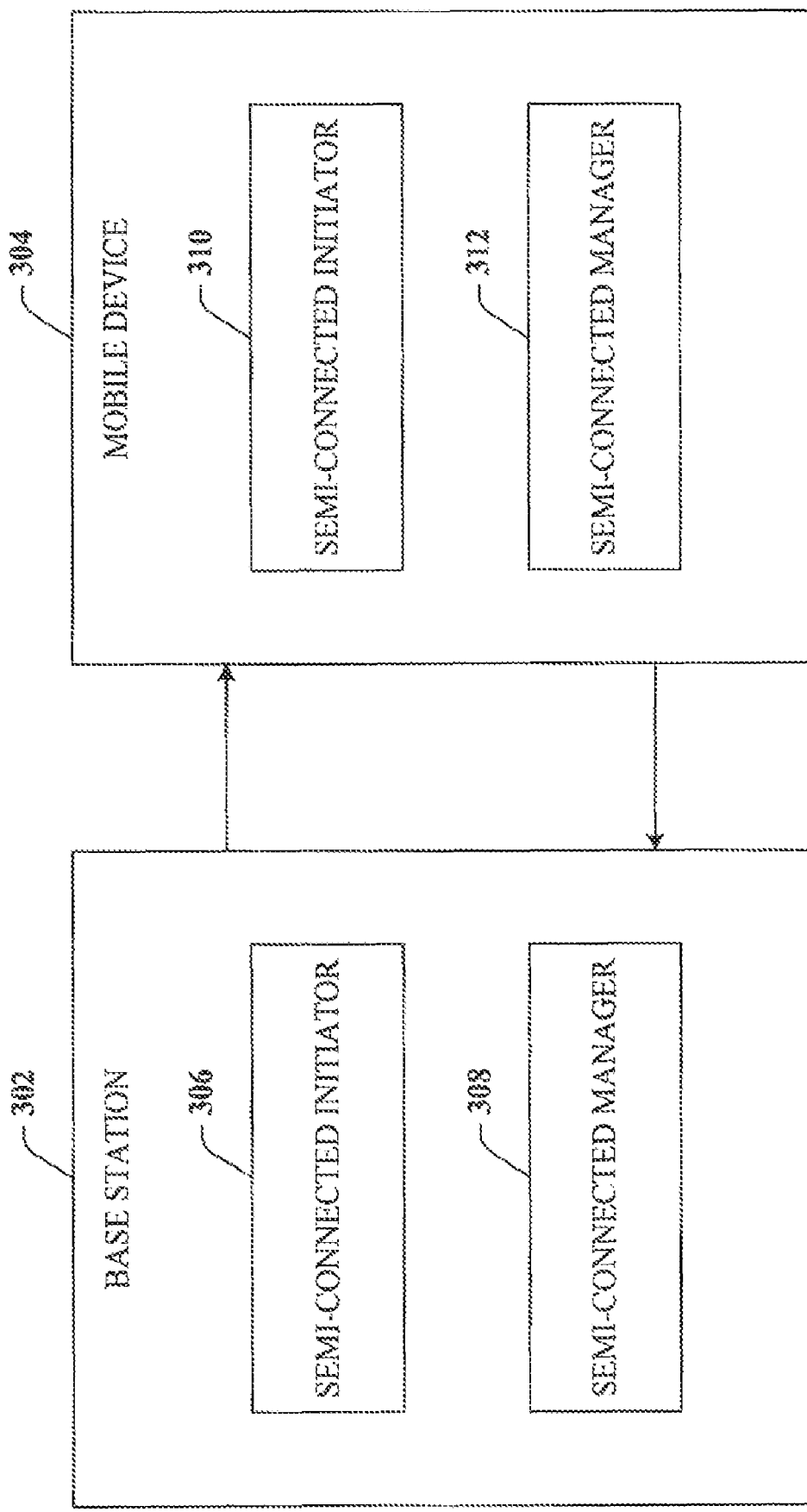
FIG. 3 is an illustration of an example wireless communications system that effectuates semi-connected operation.

Referring now to FIG. 3, illustrated is a wireless communications system 300 that effectuates a semi-connected mode of operation. System 300 includes a base station 302 that communicates with a mobile device 304 (and/or any number of disparate mobile devices (not shown)). Base station 302 may transmit information to mobile device 304 over a forward link channel; further base station 302 may receive information from mobile device 304 over a reverse link channel. Moreover, system 300 may be a MIMO system.

Mobile device 304 may include a semi-connected initiator 310. Semi-connected initiator 310 facilitates establishing a semi-connected mode or state for mobile device 304. Base station 302 may likewise include a semi-connected initiator 306 to effectuate a semi-connected operational state between base station 302 and mobile device 304. The semi-connected mode enables mobile device 304 to conserve battery power during periods of inactivity while minimizing paging delays, among other things. While in the semi-connected, mobile device 304 may be recognized by base station 302 upon access even after periods of inactivity. Thus, mobile device 304 can expedite access to base station 302 while minimizing battery consumption.

Semi-connected initiators 306 and 310 establish a semi-connected state between base station 302 and mobile device 304 via a message exchange. Prior to initiating a semi-connected mode, a configuration is negotiated. The configuration may include a semi-connect wakeup period parameter specified in physical frames. The parameter represents the number of physical frames of wakeup per period. This period can be arbitrarily long as mobile device 304 acquires timing through an access to the system. Semi-connect initiator 310 of mobile device 304 may transmit a semi-connected state start message. Mobile device 304 employs this message to initiate a semi-connected mode. This message is broadcasted to all base stations in an active set of mobile device 304. The active set may include other base station beyond base station 302 that may be acquired or utilized by mobile device 304. In addition, semi-connected initiator 310 may include a flag in the message that identifies base station 302 (or another base station) as the forward link serving sector (FLSS). Semi-connected initiator 306 of base station 302 (or the initiator of the FLSS base station) transmits a semi-connect acknowledgement message to mobile device 304 after receiving the start message. Semi-connected initiator 306 instructs mobile device 304 to enter a semi-connected mode once the acknowledgement message is received. Mobile device 304 enters a semi-connected mode when a semi-connect acknowledgement is received. Mobile device 304, while waiting for a pending acknowledge, may behave as though an acknowledgement is received if mobile device 304 performs a hand off.

It is to be appreciated that other message passing schemes may be employed to effectuate a commencement of the semi-connected state. For example, semi-connected initiator 310 of mobile device 304 may transmit a request message to base station 302 that includes the wakeup period parameter described above. Semi-connected initiator 306 of base station 302 may transmit a begin message to instruct mobile device 304 to operate in a semi-connected mode. Following the begin message, semi-connected initiator 310 may broadcast an acknowledgement message to all base stations in the active set.

Semi-connected manager 312 of mobile device 304 maintains a semi-connected state with all base stations in the active set. Semi-connected manager 312 retains a MAC ID of mobile device 304 assigned by base station 302. Accordingly, base station 302 may recognize an ongoing connection with mobile device 304 while the device sleeps during inactive periods. The forward link system is maintained between mobile device 304 and base station 302 but not the reverse link system. For example, mobile device 304 in a semi-connected mode does not transmit reverse link control channels such as a channel quality feedback channel, a sub-band scheduling feedback channel, a beam feedback channel, and pilot feedback channel and the like. Semi-connected manager 312 may switch to a fully connected mode to perform a handoff. In addition, semi-connected manager 312 of mobile device 304 may access the system to send keep-alive messages to prevent supervision failure. Moreover, while in semi-connected mode, semi-connected manager 312 of mobile device 304 may send pilot reports to add new pilots to the active set.

While in semi-connected mode, semi-connected manager 312 may wake up mobile device 304 from a sleep period at scheduled intervals and may monitor for a forward link assignment block (FLAB). In addition, semi-connected manager 312 may scan pilots to determine a need for a handoff. If needed to exchange data or to initiate handoff, mobile device 304 exits the semi-connected state and accesses the target sector. The semi-connected state may be exited by semi-connected manager 312 of mobile device 304 accessing the wireless communications system through a MAC ID scrambled access sequence similar to what is employed in asynchronous handoffs. In addition, semi-connect manager 312 may transmit a semi-connect exit message to all base stations in the active set. This message notifies non-serving base stations that mobile device 304 is connected.

Base station 302 enters a semi-connected mode when sending an acknowledgement to a start message from mobile device 304. While in the semi-connected mode, semi-connected manager 308 of base station 302 monitors for MAC ID scrambled access from mobile device 304. MAC ID scrambled access enables base station 302 to recognize mobile device 304 upon access and to provide QoS treatment immediately after access. In addition, semi-connected manager 308 may transmit a special FLAB message to mobile device 304 when there is pending data for mobile device 304. By sending a FLAB message on the shared signaling channel (SSCH), base station 302 may wake mobile device 304 without employing the paging channels. Upon receiving the FLAB, semi-connected manager 312 of mobile device 304 may access the system via MAC ID scrambled access. In accordance with another aspect, semi-connected manager may transmit a access request block (ARB) to page mobile device 304.

According to an aspect of the subject disclosure, base station 302 may be configured to detect false handoffs. Base station 302 starts a timer when another base station grabs a tunnel with mobile device 304. If an exit message is received from mobile device 304, the timer is deleted. Base station 302 reacquires the tunnel if the timer expires. To mitigate false handoffs, non-serving base stations in the semi-connected state with mobile device 304 may only initiate backhaul handoff procedures upon receiving reverse link packets from mobile device 304.

Figure 4:
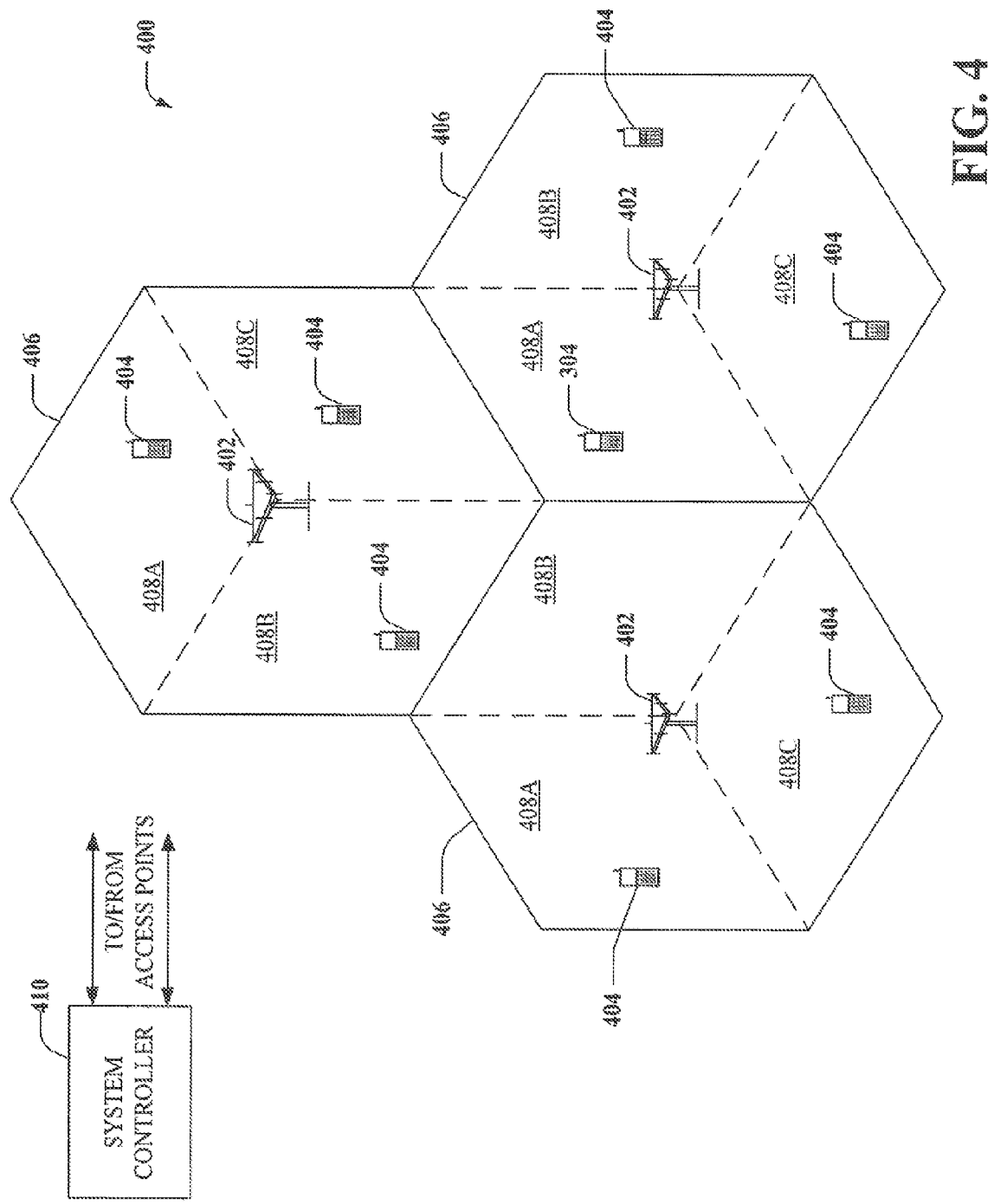
FIG. 4 is an illustration of a wireless communication system in accordance with one or more aspects presented herein.

Referring now to FIG. 4, a wireless communication system 400 in accordance with various aspects presented herein is illustrated. System 400 can comprise one or more access points 402 that receive, transmit, repeat, etc., wireless communication signals to each other and/or to one or more terminals 404. Each base station 402 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 404 can be, for example, cellular phones, smart phones, laptops, handheld communication devices, handheld computing devices, satellite radios, global positioning systems, PDAs, and/or any other suitable device for communicating over wireless system 400. In addition, each terminal 404 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 4, each access point provides communication coverage for a particular geographic area 406. The term "cell" can refer to an access point and/or its coverage area, depending on context. To improve system capacity, an access point coverage area can be partitioned into multiple smaller areas (e.g., three smaller areas 408A, 408B and 408C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 404 are typically dispersed throughout system 400. Each terminal 404 may be fixed or mobile. Each terminal 404 may communicate with one or more access points 402 on the forward and reverse links at any given moment.

For a centralized architecture, a system controller 410 couples access points 402 and provides coordination and control of access points 402. For a distributed architecture, access points 402 may communicate with one another as needed. Communication between access points via system controller 410 or the like can be referred to as backhaul signaling.

The techniques described herein may be used for a system 400 with sectorized cells as well as a system with un-sectorized cells. For clarity, the following description is for a system with sectorized cells. The term "access point" is used generically for a fixed station that serves a sector as well as a fixed station that serves a cell. The terms "terminal" and "user" are used interchangeably, and the terms "sector" and "access point" are also used interchangeably. A serving access point/sector is an access point/sector with which a terminal communicates. A neighbor access point/sector is an access point/sector with which a terminal is not in communication.

Figure 5:
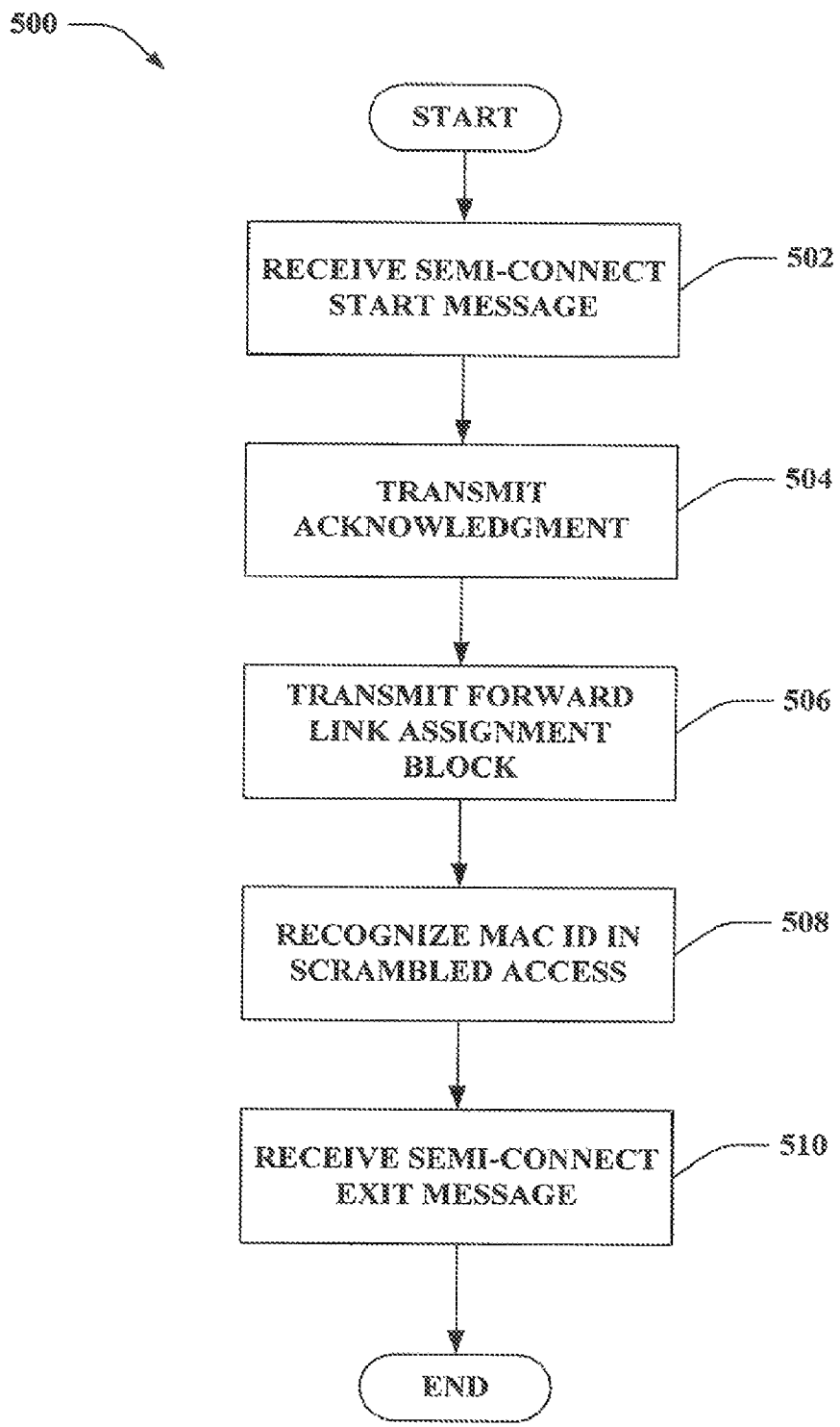
FIG. 5 is an illustration of an example methodology that facilitates employing semi-connected operations in a wireless communication system.
Figure 6:
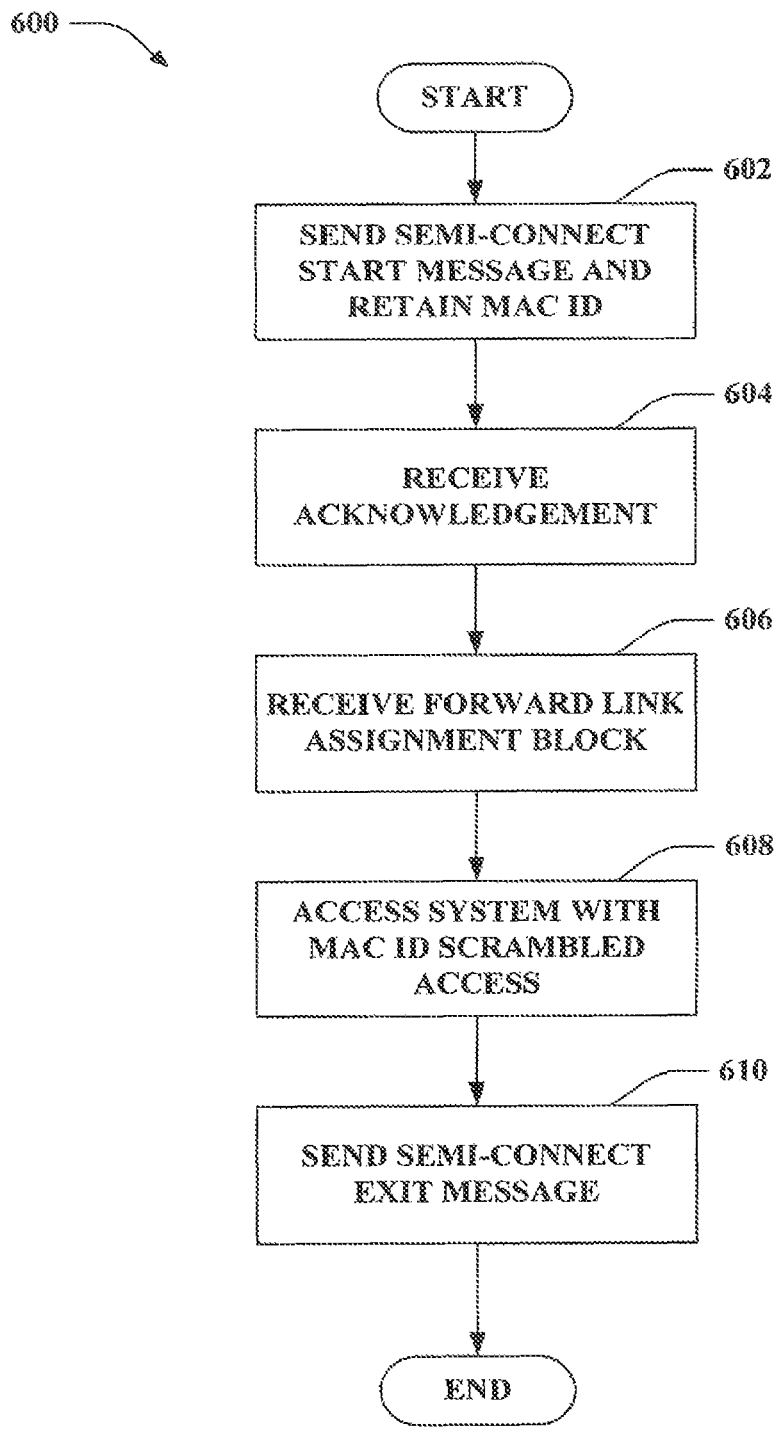
FIG. 6 is an illustration of an example methodology that facilitates employing semi-connected operations in a wireless communication system.

Referring to FIGS. 5-6, methodologies relating to a semi-connected operational mode are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates employing a semi-connected mode in a wireless communications system. Method 500 may be employed, among other things, to reduce battery consumption and increase system capacity. At reference numeral 502, a semi-connect start message is received. This message may be received from a mobile device desiring to enter into a semi-connect mode with a serving base station and all other base stations in an active set. The message may be received as a broadcast and further include a flag that identifies the forward link serving sector. At reference numeral 504, an acknowledgement of the start message may be transmitted. The acknowledgement may be utilized by a mobile device as confirmation to enter into a semi-connect mode. At reference numeral 506, a forward link assignment block (FLAB) may be transmitted. The FLAB is employed to notify a mobile device requesting the semi-connect mode that data is pending. The requesting mobile device may be in a sleep state and the FLAB transmission is employed as a page mechanism that bypasses traditional paging channels to provide expedited access. At reference numeral 508, a MAC ID is recognized in a system access employing MAC ID scrambled access. The device corresponding to the MAC ID may be provided with QoS treatment since its identity is known from time of access. At reference numeral 510, the semi-connect mode may be terminated by an exit message. The exit message may be received as a broadcast indicating that a mobile device has transitioned in a fully connected mode.

Now referring to FIG. 6, illustrated is a methodology 600 that facilitates employing a semi-connected mode in a wireless communications system. Method 600 may be employed, among other things, to reduce battery consumption and increase system capacity. At reference numeral 602, a semi-connect start message is broadcasted and a MAC ID is retained. This message may be broadcasted from a mobile device desiring to enter into a semi-connected mode with a serving base station and all other base stations in an active set. A mobile device does not relinquish its MAC ID upon entering a semi-connect mode. MAC ID retention enables a base station to identify and recognize a mobile device in a semi-connected mode upon access and may provide QoS guarantees. The broadcasted message may further include a flag that identifies a forward link serving sector. At reference numeral 604, an acknowledgement of the start message may be received. The acknowledgement may be utilized by as an indication to immediately enter the semi-connect mode. At reference numeral 606, a forward link assignment block (FLAB) transmission may be received. The FLAB is employed a notification of pending data. The semi-connected mobile device may be in a sleep state and the FLAB transmission is employed as a page mechanism that bypasses traditional paging channels to provide expedited access. At reference numeral 608, the wireless communications system is accessed employing MAC ID scrambled access. The device corresponding to the MAC ID may be provided with QoS treatment since its identity is known from time of access. At reference numeral 610, the semi-connect mode may be terminated by transmitting an exit message. The exit message may be received as a broadcast indicating that a mobile device has transitioned in a fully connected mode.

It will be appreciated that, in accordance with one or more aspects described herein, inferences can be made regarding whether a semi-connected mode should be employed, determining a wakeup period parameter, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a semi-connected mode based in part on the situation. By way of further illustration, an inference may be made related to selecting a number of physical frames as a wakeup period parameter based upon intended application, desired power savings, etc. It will be appreciated that the foregoing examples are illustrative in nature and are not intended to limit the number of inferences that can be made or the manner in which such inferences are made in conjunction with the various embodiments and/or methods described herein.

Figure 7:
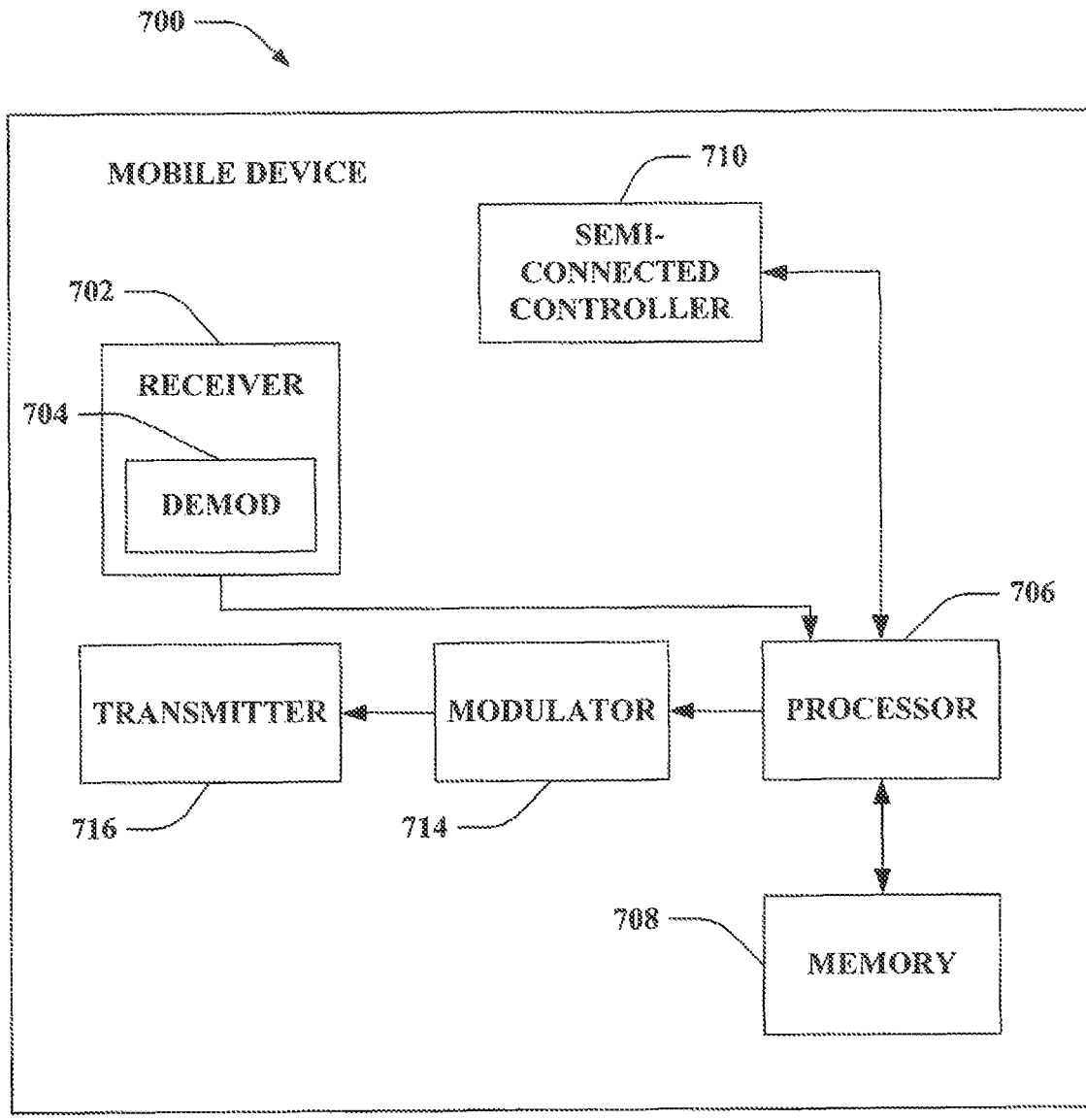
FIG. 7 is an illustration of an example mobile device that facilitates utilizing semi-connected operations in accordance with an aspect of the subject disclosure.

FIG. 7 is an illustration of a mobile device 700 that facilitates employing a semi-connected mode. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that may store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 702 is further operatively coupled to a semi-connected controller 710 that facilitates establishing and maintaining a semi-connected operational mode between mobile device 700 and all base stations in an active set. Semi-connected controller may include a semi-connected initiator and a semi-connected manager as described above with reference to FIGS. 2 and 3. The semi-connected mode, among other things, enables power savings for applications that exchange bursts of data among periods of inactivity while minimizing paging delays. While in the semi-connected mode, semi-connected controller 710 facilitates retaining a MAC ID assigned by a base station even during periods of inactivity. Thus, semi-connected controller 710 can expedite access to a base station while minimizing battery consumption. In the semi-connected mode, mobile device 700 may sleep during a specified period. The sleep period provides battery power savings compared to a connected state. A base station recognizes mobile device 700 during an access period as an ongoing connection. Thus, base station may provide QoS treatment right after access. The base station may bypass paging channels to wake mobile terminal 700, reducing latency and cost associated with paging. The semi-connected mode may return to a fully connected state with a small delay. During the transition, power and timing references may be sent after the interval while reverse control channels were deactivated. Mobile device 700 still further comprises a modulator 714 and a transmitter 716 that transmits a signal (e.g., base CQI and differential CQI) to, for instance, a base station, another mobile device, etc. Although depicted as being separate from the processor 706, it is to be appreciated that semi-connected controller 710 and/or modulator 714 may be part of processor 706 or a number of processors (not shown).

Figure 8:
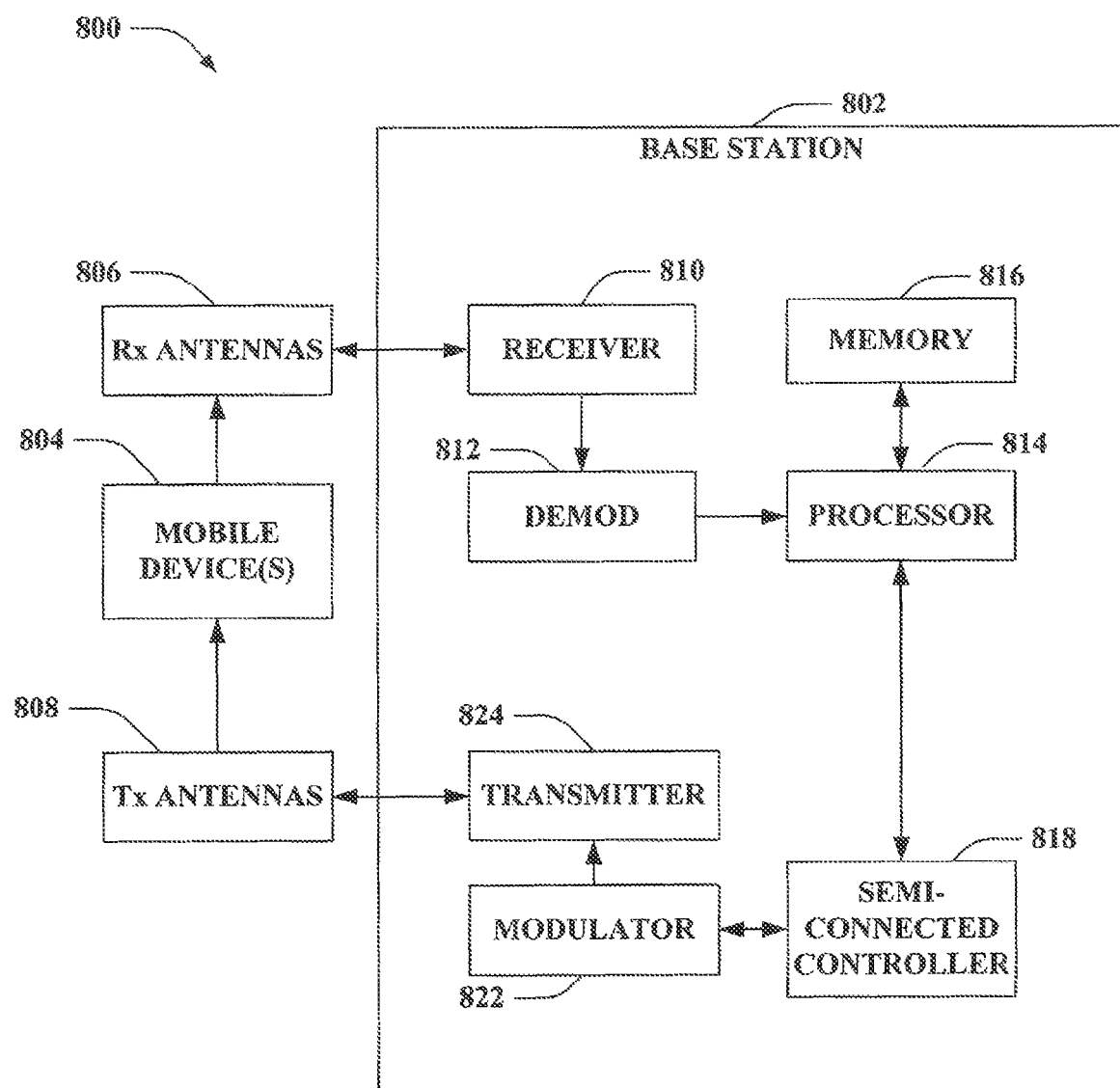
FIG. 8 is an illustration of an example system that facilitates utilizing semi-connected operations in accordance with an aspect of the subject disclosure.

FIG. 8 is an illustration of a system 800 that facilitates employing a semi-connected mode. System 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a plurality of transmit antennas 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

Processor 814 is further coupled to a semi-connected controller 818 that establishes and maintains semi-connected states with one or more of mobile devices 804. Semi-connected controller 818 initiates semi-connect mode with mobile device 804 via messaging with mobile devices 804. For example, semi-connected controller 818 may transmit and/or receive messages that start or acknowledge a semi-connect mode. Semi-connected controller 818 enables base station 800 to recognize mobile devices 804 as an ongoing connection and provide QoS guarantees immediately after access even though mobile devices 804 may sleep for a period to conserve battery power. In addition, semi-connected controller 818 enables base station 800 to bypass paging channel and signal mobile devices 804 with a forward link assignment block (FLAB) to notify mobile devices 804 of pending data. Further, processor 814 may effectuate transmitting over the forward link channel to convey a FLAB message or an ARB message. Information to be transmitted may be provided to a modulator 822. Modulator 822 can multiplex the information for transmission by a transmitter 826 through antenna 808 to mobile device(s) 804. Although depicted as being separate from the processor 814, it is to be appreciated that semi-connected controller 818 and/or modulator 822 may be part of processor 814 or a number of processors (not shown).

Figure 9:
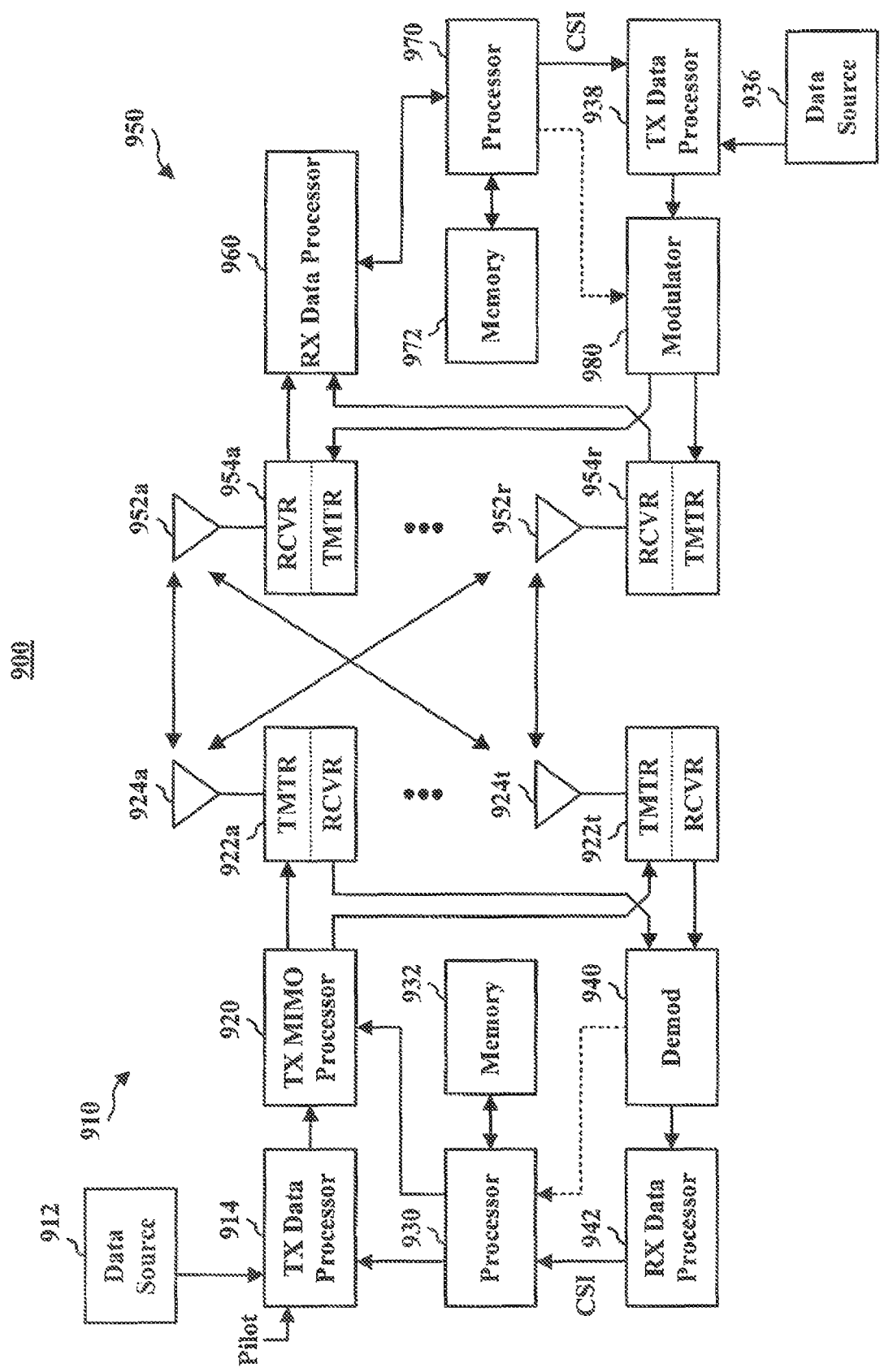
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 may include more than one base station and/or more than one mobile device, wherein additional base stations and/or mobile devices may be substantially similar or different from example base station 910 and mobile device 950 described below. In addition, it is to be appreciated that base station 910 and/or mobile device 950 may employ the systems (FIGS. 1-4 and 7-8) and/or methods (FIGS. 5-6) described herein to facilitate wireless communication there between.

At base station 910, traffic data for a number of data streams is provided from a data source 912 to a transmit (TX) data processor 914. According to an example, each data stream may be transmitted over a respective antenna. TX data processor 914 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 950 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 930.

The modulation symbols for the data streams may be provided to a TX MIMO processor 920, which may further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 may receive and process the $N_R$ received symbol streams from $N_R$ receivers 954 based on a particular receiver processing technique to provide $N_T$ "detected" symbol streams. RX data processor 960 may demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 may periodically determine which precoding matrix to utilize as discussed above. Further, processor 970 may formulate a reverse link message comprising a matrix index portion and a rank value portion.

The reverse link message may comprise various types of information regarding the communication link and/or the received data stream. The reverse link message may be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 may process the extracted message to determine which precoding matrix to use for determining the beamforming weights.

Processors 930 and 970 may direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
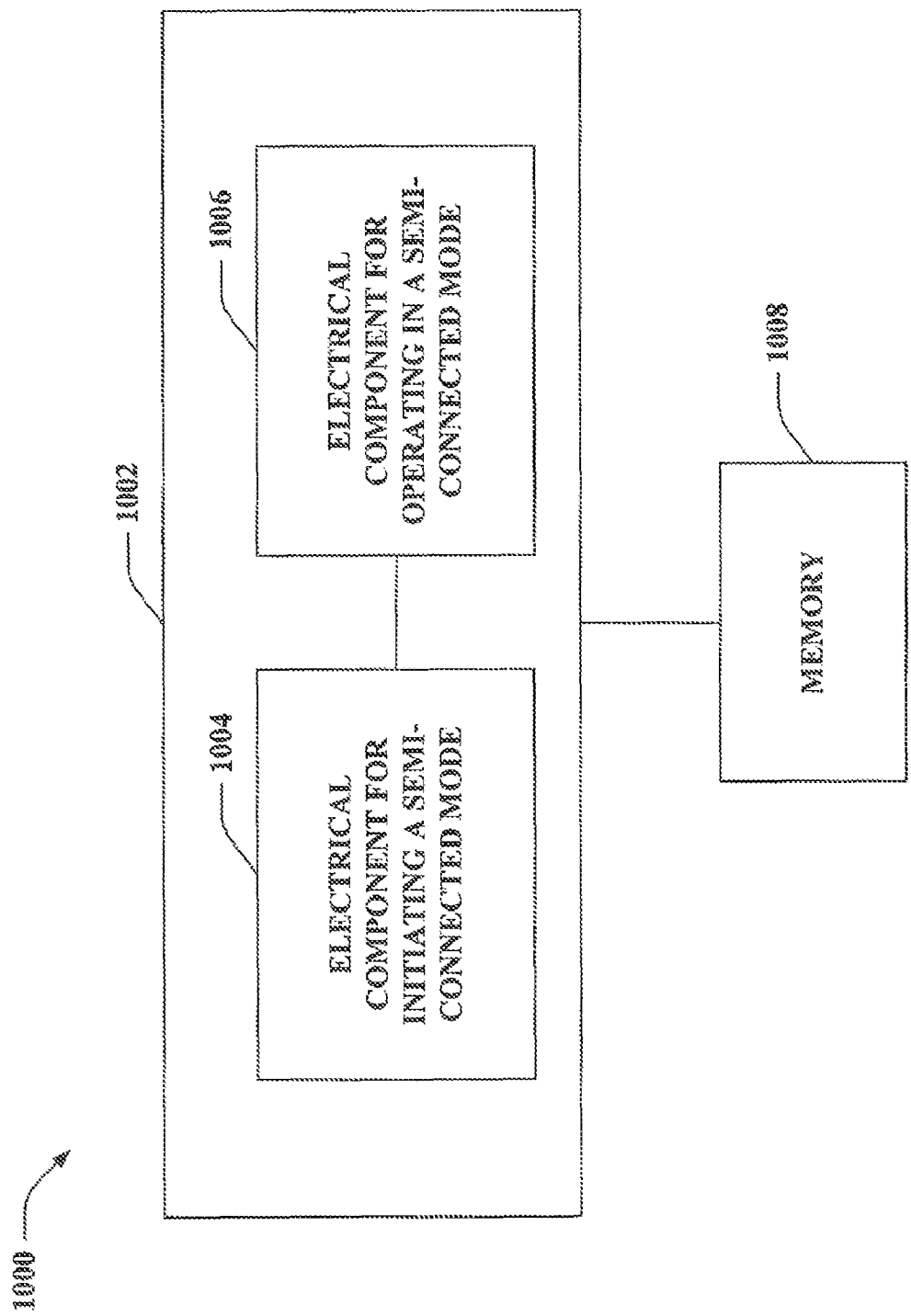
FIG. 10 is an illustration of an example system that facilitates employing semi-connected mechanisms.

With reference to FIG. 10, illustrated is a system 1000 that effectuates reduce power consumption during periods of inactivity by operating in a reduce power mode for applications that intermix bursty traffic with inactivity. For example, system 1000 may reside at least partially within a mobile device. It is to be appreciated that system 1000 is represented as including functional blocks, which may be functional blocks that represent functions implemented by a processor, software, or combination thereof (e.g., firmware). System 1000 includes a logical grouping 1002 of electrical components that can act in conjunction. For instance, logical grouping 1002 may include an electrical component for initiating a semi-connected mode. Semi-connected modes enable a mobile device to conserve battery power during inactive periods while allowing fast reacquisition of the system. A mobile device enters into a semi-connected state via message passing with a base station. In addition, the mobile device operate in a semi-connected mode with all base stations in the active set. Further, logical grouping 1002 may comprise an electrical component for operating in a semi-connected mode. For example, a mobile device may sleep during periods of inactivity while in a semi-connected state. Further, the mobile device retains a MAC ID during inactivity to expedite system access upon wakeup. The mobile device may employ MAC ID scrambled access that enables the base station to identify the mobile device and immediately provide QoS treatment, among other things, upon access. The mobile device retains a MAC ID during periods of inactivity so that return access is not anonymous. Additionally, system 1000 may include a memory 1008 that retains instructions for executing functions associated with electrical components 1004 and 1006. While shown as being external to memory 1008, it is to be understood that one or more of electrical components 1004 and 1006 may exist within memory 1008.

Figure 11:
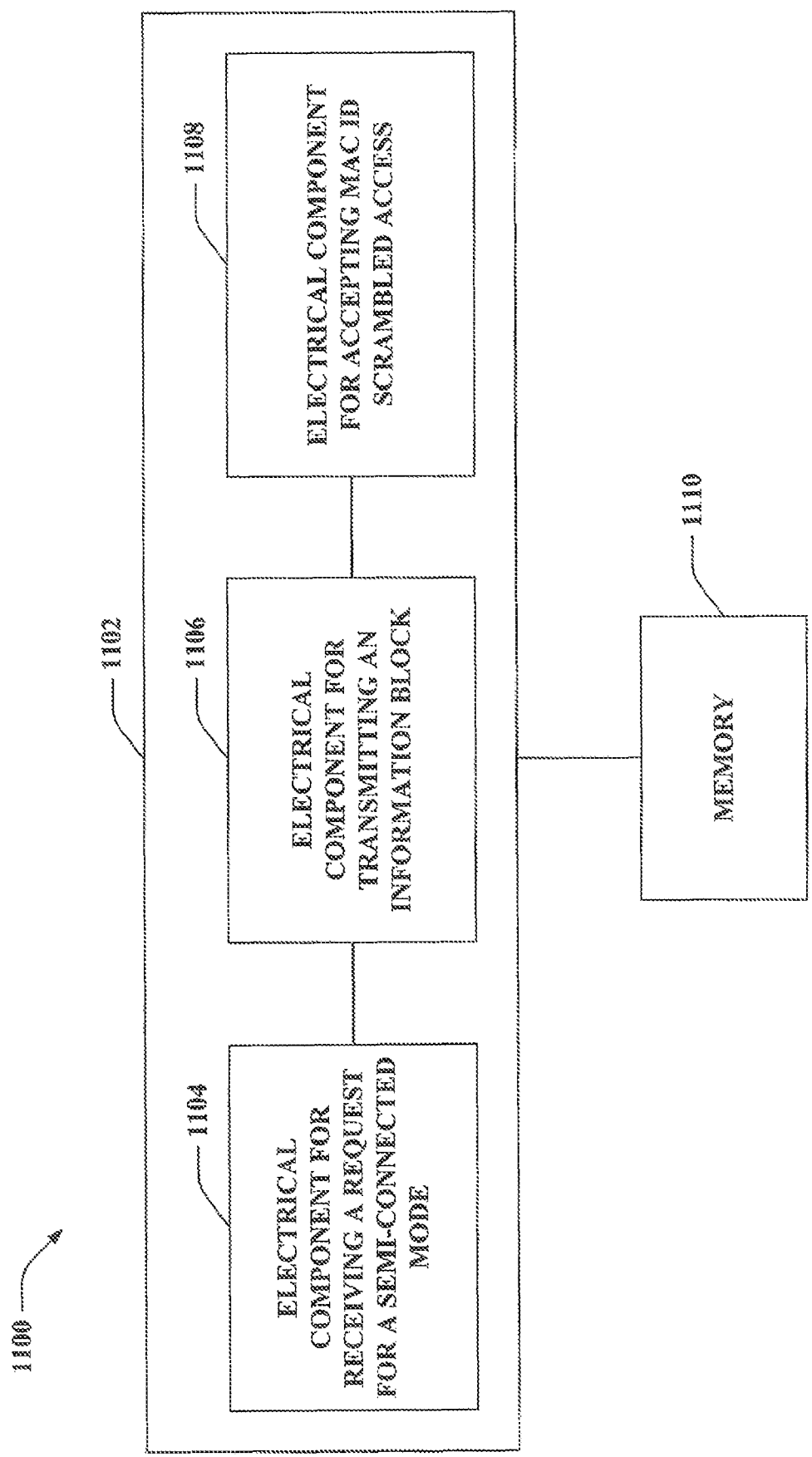
FIG. 11 is an illustration of an example system that facilitates utilizing semi-connected operations in a wireless communication system.

Turning to FIG. 11, illustrated is a system 1100 that calculates reduced feedback by employing successive interference operations on permuted codewords. System 1100 may reside within a base station, for instance. As depicted, system 1100 includes functional blocks that may represent functions implemented by a processor, software, or combination thereof (e.g. firmware). System 1100 includes a logical grouping 1102 of electrical components that facilitate controlling forward link transmission. Logical grouping 1102 may include an electrical component for receiving a request for a semi-connected mode 1104. For example, a receiver may be included in a base station to receive a message from a mobile device desiring to enter into a a semi-connected mode. The initial message from the mobile device may include a parameter that specifies a period of wakeup in physical frames. Moreover, logical grouping 1102 may include an electrical component for transmitting an information block 1106. According to an example, a forward link assignment block is transmitted on the shared signaling channel during the wakeup period for a mobile device in a semi-connected mode. The information block may provide a notification to a mobile device that data is pending. The mobile device may access the system to retrieve the data. Further, logical grouping 1102 may comprise an electrical component for accepting MAC ID scrambled access 1108. A mobile device may employ MAC ID scrambled access to retrieve pending data. The means of access enables a base station to recognize the mobile device quickly after a period of inactivity and, accordingly, can provide QoS treatment, among other things, upon access. Additionally, system 1100 may include a memory 1110 that retains instructions for executing functions associated with electrical components 1104, 1106, and 1108. While shown as being external to memory 1110, it is to be understood that electrical components 1104, 1106, and 1108 may exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a mobile device in a wireless communications system, comprising:
    initiating a semi-connected mode with one or more base stations in an active set in which the mobile device sends a semi-connected start message, retains a MAC ID that enables expedited system access, and enters a sleep state;
    operating in the semi-connected mode in which the mobile device wakes at scheduled intervals to monitor for a forward link assignment block, wherein the forward link assignment block is employed as a page mechanism that bypasses traditional paging channels to provide expedited system access; and
    exiting the semi-connected mode on receipt of the forward link assignment block on a shared signaling channel.

2. The method of claim 1, further comprising sleeping during a period of inactivity while in the semi-connected mode.

3. The method of claim 1, further comprising retaining a MAC ID from each member of the active set during periods of inactivity.

4. The method of claim 1, further comprising receiving an information block on a shared signal channel during a wakeup period.

5. The method of claim 1, wherein initiating the semi-connected mode comprises transmitting at least one message to one or more base stations in the active set that includes a parameter specifying a number of physical frames of wakeup per period.

6. The method of claim 5, wherein transmitting at least one message comprises sending the semi-connected start message to a serving sector base station.

7. The method of claim 6, wherein the start message is sent over the air or tunneled through a serving sector to all base stations in the active set.

8. The method of claim 6, further comprising receiving a semi-connect acknowledgement message in response to the start message.

9. The method of claim 1, further comprising broadcasting a semi-connect exit message to terminate the semi-connected mode.

10. The method of claim 4, wherein the information block is the forward link assignment block.

11. The method of claim 1, further comprising monitoring forward pilot channels of active set members.

12. The method of claim 11, further comprising utilizing MAC ID scrambled access to initiate handoff.

13. A wireless communications apparatus, comprising:
    a memory that stores instructions related to:
        initiating a semi-connected mode with one or more base stations in an active set in which a mobile device sends a semi-connected start message, retains a MAC ID that enables expedited system access, and enters a sleep state;
        operating in the semi-connected mode in which the mobile device wakes at scheduled intervals to monitor for a forward link assignment block, wherein the forward link assignment block is employed as a page mechanism that bypasses traditional paging channels to provide expedited system access; and
        exiting the semi-connected mode on receipt of the forward link assignment block on a shared signaling channel; and
    a processor coupled to the memory, configured to execute the instructions retained in the memory.

14. A wireless communications apparatus that effectuates reduce power consumption during periods of inactivity, comprising:
    means for initiating a semi-connected mode with one or more base stations in an active set in which a mobile device sends a semi-connected start message, retains a MAC ID that enables expedited system access, and enters a sleep state;
    means for operating in the semi-connected mode in which the mobile device wakes at scheduled intervals to monitor for a forward link assignment block, wherein the forward link assignment block is employed as a page mechanism that bypasses traditional paging channels to provide expedited system access; and
    means for exiting the semi-connected mode on receipt of the forward link assignment block on a shared signaling channel.

15. The wireless communications apparatus of claim 14, further comprising means for sleeping during a period of inactivity while in the semi-connected mode.

16. The wireless communications apparatus of claim 14, further comprising means for retaining a MAC ID from each member of the active set during periods of inactivity.

17. The wireless communications apparatus of claim 14, further comprising means for receiving an information block on a shared signal channel during a wakeup period.

18. The wireless communications apparatus of claim 14, wherein the means for initiating the semi-connected mode comprises means for transmitting at least one message to one or more base stations in the active set that includes a parameter specifying a number of physical frames of wakeup per period.

19. The wireless communications apparatus of claim 18, wherein transmitting at least one message comprises sending the semi-connected start message to a serving sector base station.

20. The wireless communications apparatus of claim 19, wherein the start message is sent over the air or tunneled through a serving sector to all base stations in the active set.

21. The wireless communications apparatus of claim 20, further comprising means for receiving a semi-connected acknowledgement message in response to the start message.

22. The wireless communications apparatus of claim 14, further comprising means for broadcasting a semi-connected exit message to terminate the semi-connected mode.

23. The wireless communications apparatus of claim 17, wherein the information block is the forward link assignment block.

24. The wireless communications apparatus of claim 14, further comprising means for monitoring forward pilot channels of active set members.

25. The wireless communications apparatus of claim 24, further comprising utilizing MAC ID scrambled access to initiate handoff.

26. A non-transitory machine-readable medium having stored thereon machine-executable instructions for:
    initiating a semi-connected mode with one or more base stations in an active set in which a mobile device sends a semi-connected start message, retains a MAC ID that enables expedited system access, and enters a sleep state;
    operating in the semi-connected mode in which the mobile device wakes at scheduled intervals to monitor for a forward link assignment block, wherein the forward link assignment block is employed as a page mechanism that bypasses traditional paging channels to provide expedited system access; and
    exiting the semi-connected mode on receipt of the forward link assignment block on a shared signaling channel.

27. The machine-readable medium of claim 26, further comprising sleeping during a period of inactivity while in the semi-connected mode.

28. The machine-readable medium of claim 26, further comprising retaining a MAC ID from each member of the active set during periods of inactivity.

29. The machine-readable medium of claim 26, further comprising receiving an information block on a shared signal channel during a wakeup period.

30. The machine-readable medium of claim 26, wherein initiating the semi-connected mode comprises transmitting at least one message to one or more base stations in the active set that includes a parameter specifying a number of physical frames of wakeup per period.

31. The machine-readable medium of claim 30, wherein transmitting at least one message comprises sending the semi-connected start message to a serving sector base station.

32. The machine-readable medium of claim 31, wherein the start message is sent over the air or tunneled through a serving sector to all base stations in the active set.

33. The machine-readable medium of claim 32, further comprising receiving a semi-connected acknowledgement message in response to the start message.

34. The machine-readable medium of claim 26, further comprising broadcasting a semi-connected exit message to terminate the semi-connected mode.

35. The machine-readable medium of claim 29, wherein the information block is a forward link assignment block.

36. The machine-readable medium of claim 26, further comprising instructions for monitoring forward pilot channels of active set members.

37. The machine-readable medium of claim 36, further comprising instructions for utilizing MAC ID scrambled access to initiate handoff.

38. In a wireless communication system, an apparatus comprising:
    a processor configured to:
    initiate a semi-connected mode with one or more base stations in an active set in which a mobile device sends a semi-connected start message, retains a MAC ID that enables expedited system access, and enters a sleep state;
    operate in the semi-connected mode in which the mobile device wakes at scheduled intervals to monitor for a forward link assignment block, wherein the forward link assignment block is employed as a page mechanism that bypasses traditional paging channels to provide expedited system access; and
    exit the semi-connected mode on receipt of the forward link assignment block on a shared signaling channel.

39. A method of operating a mobile device in a wireless communications system, comprising:
    initiating a semi-connected mode with one or more base stations in an active set in which the mobile device sends a semi-connected start message, retains a MAC ID that enables expedited system access, and enters a sleep state;
    operating in the semi-connected mode in which the mobile device wakes at scheduled intervals to monitor for a forward link assignment block, wherein the forward link assignment block is employed as a page mechanism that bypasses traditional paging channels to provide expedited system access; and
    exiting the semi-connected mode on receipt of the forward link assignment block on a shared signaling channel thereby enabling expedited system access by receiving the forward link assignment block as a paging mechanism.

40. The method of claim 39, further comprising identifying the mobile device through the MAC ID retained by the mobile device.

41. The method of claim 40, further comprising providing quality of service (QoS) treatment to the mobile device upon access.

42. The method of claim 39, further comprising maintaining a forward link while not transmitting on a reverse link.

43. The method of claim 39, further comprising transmitting at least one acknowledgement message in response to the request.

44. The method of claim 39, further comprising detecting a false handoff.

45. The method of claim 44, wherein detecting the false handoff comprises:
   starting a timer when a non-serving base station grabs a tunnel;
   reacquiring the tunnel upon timer expiration; and
   deleting the timer upon receipt of a semi-connected exit message.

46. A wireless communications apparatus, comprising:
   a memory that stores instructions related to:
   receiving a request from a mobile device to initiate a semi-connected mode;
   retaining a MAC ID of the mobile device to enable expedited system access;
   transmitting a forward link assignment block on a shared signaling channel to notify the mobile device of pending data and to cause the mobile device to exit the semi-connected mode, wherein the forward link assignment block is employed as a page mechanism that bypasses traditional paging channels to provide expedited system access; and
   accepting access using the MAC ID; and
   a processor coupled to the memory, configured to execute the instructions retained in the memory.

47. A wireless communications apparatus, comprising:
   means for receiving a request from a mobile device to initiate a semi-connected mode;
   means for retaining a MAC ID of the mobile device to enable expedited system access;
   means for transmitting a forward link assignment block on a shared signaling channel to notify the mobile device of pending data and to cause the mobile device to exit the semi-connected mode, wherein the forward link assignment block is employed as a page mechanism that bypasses traditional paging channels to provide expedited system access; and
   means for accepting communications using the MAC ID.

48. The wireless communications apparatus of claim 47, further comprising means for identifying the mobile device through the MAC ID retained by the mobile device.

49. The wireless communications apparatus of claim 48, further comprising means for providing quality of service (QoS) treatment to the mobile device upon access.

50. The wireless communications apparatus of claim 47, further comprising means for maintaining a forward link while not transmitting on a reverse link.

51. The wireless communications apparatus of claim 47, further comprising means for transmitting at least one acknowledgement message response to the request.

52. The wireless communications apparatus of claim 47, further comprising means for detecting a false handoff.

53. The wireless communications apparatus of claim 52, wherein means for detecting the false handoff comprises:
   means for initiating a timer when a non-serving base station grabs a tunnel;
   means for reacquiring the tunnel upon timer expiration; and
   means for deleting the timer upon receipt of a semi-connect exit message.

54. A non-transitory machine-readable medium having stored thereon machine-executable instructions for:
   receiving a request from a mobile device to initiate a semi-connected mode;
   retaining a MAC ID of the mobile device to enable expedited system access;
   transmitting a forward link assignment block on a shared signaling channel to notify the mobile device of pending data and to cause the mobile device to exit the semi-connected mode, wherein the forward link assignment block is employed as a page mechanism that bypasses traditional paging channels to provide expedited system access; and
   accepting communications using the MAC ID.

55. The machine-readable medium of claim 54, further comprising identifying the mobile device through the MAC ID retained by the mobile device.

56. The machine-readable medium of claim 55, further comprising providing quality of service (QoS) treatment to the mobile device upon access.

57. The machine-readable medium of claim 54, further comprising maintaining a forward link while not transmitting on a reverse link.

58. The machine-readable medium of claim 54, further comprising transmitting at least one acknowledgement message response to the request.

59. The machine-readable medium of claim 54, further comprising detecting a false handoff.

60. The machine-readable medium of claim 59, wherein detecting the false handoff comprises:
   starting a timer when a non-serving base station grabs a tunnel;
   reacquiring the tunnel upon timer expiration; and
   deleting the timer upon receipt of a semi-connect exit message.

61. In a wireless communication system, an apparatus comprising:
   a processor configured to:
   receive a request from a mobile device to initiate a semi-connected mode;
   retain a MAC ID of the mobile device to enable expedited system access;
   transmit a forward link assignment block on a shared signaling channel to notify the mobile device of pending data and to cause the mobile device to exit the semi-connected mode, wherein the forward link assignment block is employed as a page mechanism that bypasses traditional paging channels to provide expedited system access; and
   accept communications using the MAC ID.

62. The method of claim 1, further comprising accessing the system with MAC ID scrambled access.

63. The wireless communications apparatus of claim 14, further comprising means for accessing the system with MAC ID scrambled access.

64. The machine-readable medium of claim 26, further comprising accessing the system with MAC ID scrambled access.

* * * * *